US009642139B1

United States Patent
Park et al.

(10) Patent No.: US 9,642,139 B1
(45) Date of Patent: May 2, 2017

(54) IN-BAND BACKHAUL FROM A WIRELESS MACROCELL

(71) Applicant: Sprint Communications Company L.P., Overland Park, KS (US)

(72) Inventors: Sungki Park, Ashburn, VA (US); Saied Kazeminejad, Ashburn, VA (US); Brett L. Christian, Independence, MO (US); Brent A. Scott, Leeton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 45 days.

(21) Appl. No.: 14/079,735

(22) Filed: Nov. 14, 2013

(51) Int. Cl.
*H04W 72/00* (2009.01)
*H04W 72/04* (2009.01)

(52) U.S. Cl.
CPC .............................. *H04W 72/0453* (2013.01)

(58) Field of Classification Search
CPC ................................................ H04W 72/0453
See application file for complete search history.

(56) References Cited

U.S. PATENT DOCUMENTS

| 7,853,264 | B1 | 12/2010 | Oh |
| 2008/0049672 | A1 | 2/2008 | Barak et al. |
| 2008/0090575 | A1 | 4/2008 | Barak et al. |
| 2009/0041151 | A1* | 2/2009 | Khan et al. ................... 375/267 |
| 2009/0323621 | A1 | 12/2009 | Touboul et al. |
| 2012/0213189 | A1* | 8/2012 | Choi ................. H04W 72/1231 370/329 |
| 2012/0231806 | A1 | 9/2012 | Maric et al. |
| 2013/0155949 | A1* | 6/2013 | Pochop, Jr. .......... H04B 7/0426 370/328 |

FOREIGN PATENT DOCUMENTS

| EP | 2298018 | 1/2010 |
| EP | 2351252 | 4/2010 |
| WO | 2010001394 | 1/2010 |
| WO | 2010046890 | 4/2010 |

* cited by examiner

*Primary Examiner* — Idowu O Osifade

(57) ABSTRACT

Embodiments disclosed herein provide systems and methods for providing in-band backhaul from a wireless macrocell. In a particular embodiment, a method is provided for operating a wireless communication system allocated a plurality of frequency resource segments. The method provides receiving communications for wireless transfer from the wireless communication system using a first antenna system and a second antenna system, wherein a gain of the first antenna system is higher than a gain of the second antenna system. The method further provides determining a first subset of the communications that should be transferred over the first antenna system and transferring the first subset of the communications from the first antenna system using a first portion of the frequency resource segments. The method further provides transferring the remaining communications from the second antenna system using frequency resource segments other than the first portion of the frequency resource segments.

20 Claims, 8 Drawing Sheets

IN-BAND BACKHAUL FROM A WIRELESS MACROCELL

TECHNICAL BACKGROUND

Wireless communication networks provide wireless communication services to wireless communication devices over a relatively large area. In some cases, a wireless network will supplement the coverage area of wireless macrocells with lower power picocells. A picocell typically provides wireless communication devices with access to the wireless network in areas where the macrocells are either not able to provide wireless service or where the picocell would be able to better provide wireless service.

In order to provide wireless services, the picocell, like a macrocell, requires a backhaul link to communicate with the wireless network. In many cases, a picocell will connect to the wireless network via an Internet connection (e.g. cable, DSL, or otherwise) at the location where the picocell is placed. In some other cases, a wired Internet connection may not be feasible at a particular picocell location or may otherwise not be the most cost effective or practical option.

Overview

Embodiments disclosed herein provide systems and methods for providing in-band backhaul from a wireless macrocell. In a particular embodiment, a method is provided for operating a wireless communication system allocated a plurality of frequency resource segments. The method provides receiving communications for wireless transfer from the wireless communication system using a first antenna system and a second antenna system, wherein a gain of the first antenna system is higher than a gain of the second antenna system. The method further provides determining a first subset of the communications that should be transferred over the first antenna system and transferring the first subset of the communications from the first antenna system using a first portion of the plurality of frequency resource segments. The method further provides transferring communications other than the first subset of the communications from the second antenna system using frequency resource segments other than the first portion of the plurality of frequency resource segment

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
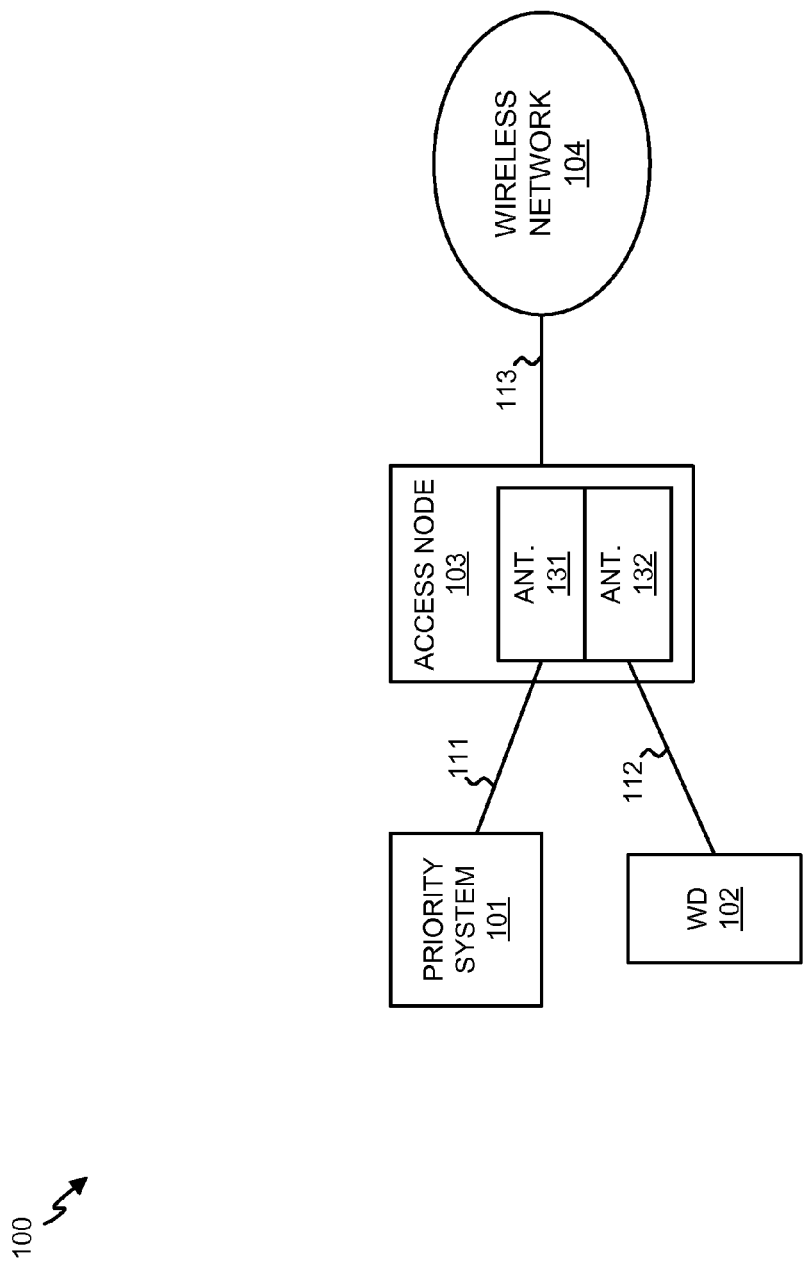
FIG. 1 illustrates a wireless communication system for providing in-band backhaul from a wireless macrocell.

FIG. 1 illustrates wireless communication system 100. Wireless communication system 100 includes priority system 101, wireless communication device 102, wireless access node 103, and wireless communication network 104. Wireless access node includes antenna system 131 and antenna system 132. Priority system 101 and wireless access node 103 communicate over wireless link 111. Wireless communication device 102 and wireless access node 103 communicate over wireless link 112. Wireless access node 103 and wireless communication network 104 communicate over communication link 113.

In operation, access node 103 is a macrocell, such as a base station or eNodeB, of wireless network 104. Access node 103 provides wireless communication services to priority system 101 and wireless device 102. To provide the communication services, access node 103 is allocated a portion of wireless frequency spectrum over which communications can be exchanged. The portion of frequency spectrum is further divided into frequency resource segments that allow access node 103 to exchange communications with multiple devices. For example, one device may exchange communications with access node 103 using one or more resource segments while another device exchanges communications with access node 103 using a different one or more resource segments. The frequency resource segments may partition the allocated frequency spectrum in a time division scheme, a frequency division scheme, a code division scheme, or any other manner of separating spectrum for use by multiple devices—including combinations thereof.

Priority system 101 may be a picocell that provides communication services to wireless communication devices in a similar manner as access node 103 but over a much smaller coverage area. Alternatively, priority system 101 could be any other type of device or system that may use dedicated wireless resources of access node 103. For example, priority system 101 may be allocated a certain portion of the frequency resource segments for access node 103. Other frequency resource segments of access node 103 may be allocated between other wireless devices communicating with access node 103, such as wireless device 101. Unlike the segments allocated to priority system 101, the segments allocated to other devices are not constant and may be allocated and de-allocated depending on the traffic channel needs of the other devices. Thus, since priority system 101 is allocated dedicated resources, the wireless service provided to priority system 101 is not affected by access node 103's need to divide the other resources among other wireless devices. However, the wireless service provided to priority system 101 is still limited by other factors affecting the wireless signal from access node 102 (e.g. signal attenuation, interference, etc.).

Figure 2:
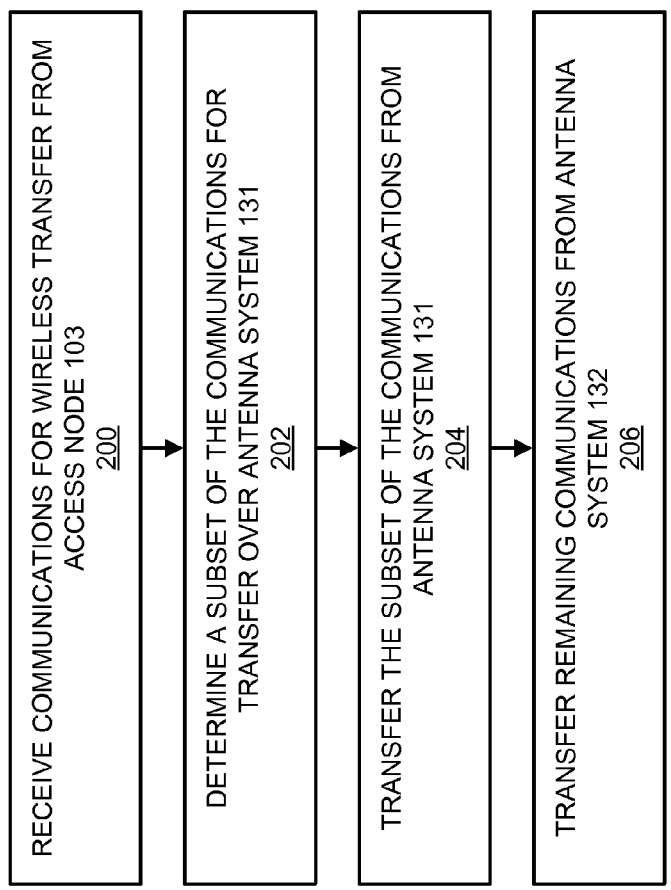
FIG. 2 illustrates an operation of the wireless communication system to provide in-band backhaul from a wireless macrocell.

FIG. 2 illustrates the operation of wireless communication system 100 to provide in-band backhaul from a wireless macrocell. Access node 103 receives communications for wireless transfer using antenna system 131 and antenna system 132, wherein a gain of antenna system 131 is higher than a gain of antenna system 132 (step 200). The communications may be voice, video, messaging, web browsing, application data, or any type of communications that could be transferred to a wireless receiver, such as priority system 101 or wireless device 102, including combinations thereof. The communications may originate from wireless network 104 or from a system outside of wireless network 104, such as a system located over the Internet.

Access node 103 determines a subset of the communications that should be transferred over antenna system 131 (step 202). The subset of the communications comprises communications directed to priority system 101. Access node 103 may use any method of distinguishing which communications are destined to each of multiple connected wireless devices or systems. For example, access node 103 may determine that the subset is directed to priority system 101 based on an indicator(s) associated with the subset. For example, the communications may comprise data packets and a header for the data packets indicates a network address associated with priority system 101.

The subset of the communications is then transferred from antenna system 131 to priority system 101 using a first portion of frequency resource segments for the frequency band allocated to access node 103 (step 204). Additionally, communications other than the subset of the communications from antenna system 132 using frequency resource segments other than the first portion of frequency resource segments (step 206). The communications may be transferred from each of antenna systems 131 and 132 using the same wireless protocol. For example, access node 103 the communications from each antenna system 131 and 132 may be formatted as though the communications were being transferred from a single antenna system. Thus, wireless device 102 is able to distinguish between communications destined for priority system 101 and communications destined for wireless device 102 in the same manner as though the communications were transferred from the same antenna system.

Advantageously, communications destined for priority system 101 are transferred over a higher gain antenna system 131 than are other communications. This arrangement provides priority system 101 with a stronger signal than would be received from antenna system 132 if priority system 101 were simply allocated frequency resource segments transferred from antenna system 132. In other words, the operation described above allows priority system 101 and wireless device 102 to continue operating as though they are two devices in communication with a single antenna system of access node 103 while priority system 101 is actually receiving its portion of access node 103's frequency resource segments from a higher gain antenna system.

It should be further understood that the method described above may be used with priority systems communicating with access node 103 in addition to priority system 101. Communications directed to those additional priority systems may also be transferred from antenna system 131 or access node 103 may include other antenna systems with higher gain than antenna system 132.

Referring back to FIG. 1, priority system 101 comprises Radio Frequency (RF) communication circuitry and an antenna. The RF communication circuitry typically includes an amplifier, filter, modulator, and signal processing circuitry. Priority system 101 may also include a user interface, memory device, software, processing circuitry, or some other communication components. Priority system 101 may be a picocell, a telephone, computer, e-book, mobile Internet appliance, wireless network interface card, media player, game console, or some other wireless communication apparatus—including combinations thereof.

Wireless communication device 102 comprises Radio Frequency (RF) communication circuitry and an antenna. The RF communication circuitry typically includes an amplifier, filter, modulator, and signal processing circuitry. Wireless communication device 102 may also include a user interface, memory device, software, processing circuitry, or some other communication components. Wireless communication device 102 may be a telephone, computer, e-book, mobile Internet appliance, wireless network interface card, media player, game console, or some other wireless communication apparatus—including combinations thereof.

Wireless access node 103 comprises RF communication circuitry and antenna systems 131 and 132. The RF communication circuitry typically includes an amplifier, filter, RF modulator, and signal processing circuitry. Antenna systems 131 and 132 each include one or more antenna elements and may each also include elements of the RF communication circuitry, such as an amplifier. Wireless access node 103 may also comprise a router, server, memory device, software, processing circuitry, cabling, power supply, network communication interface, structural support, or some other communication apparatus. Wireless access node 103 could be a base station, eNodeB, Internet access node, telephony service node, wireless data access point, or some other wireless communication system—including combinations thereof.

Wireless communication network 104 comprises network elements that provide communications services to priority system 101 and wireless device 102 through wireless access node 103. Wireless communication network 104 may comprise switches, additional wireless access nodes, Internet routers, network gateways, application servers, computer systems, communication links, or some other type of communication equipment—including combinations thereof.

Wireless links 111-112 use the air or space as the transport media. Wireless links 111-112 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 113 uses metal, glass, air, space, or some other material as the transport media. Communication link 113 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 113 could be a direct link or may include intermediate networks, systems, or devices.

Figure 3:
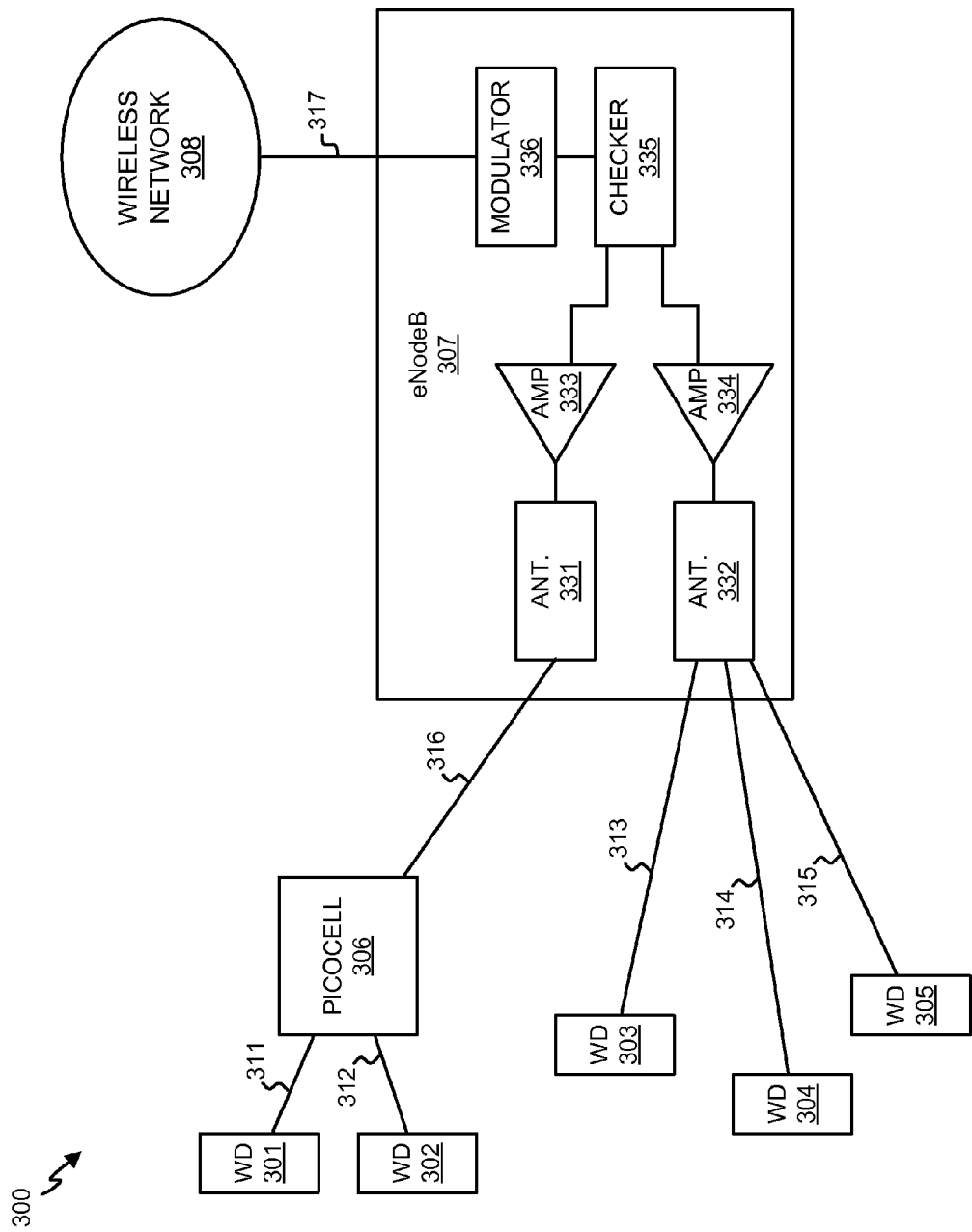
FIG. 3 illustrates a wireless communication system for providing in-band backhaul from a wireless macrocell.

FIG. 3 illustrates wireless communications system 300. Wireless communication system 300 includes wireless communication devices 301-305, picocell 306, eNodeB 307, and wireless communication network 308. eNodeB 307 includes modulator 336, segment checker 335, a first antenna system comprising one or more antenna elements 331 and amplifier 333, and a second antenna system comprising one or more antenna elements 332 and amplifier 334. Wireless devices 301-302 and picocell 306 communicate over wireless links 311-312, respectively. Wireless device 303-305 and eNodeB 307 communicate over wireless links 313-315, respectively. Picocell 306 and eNodeB 307 communicate over wireless link 316. Wireless network 308 and eNodeB 307 communicate over communication link 317. Elements 331-336 of eNodeB 307 communicate over communication links internal to eNodeB 307.

In operation, wireless devices 303-305 and picocell 306 exchange communications with eNodeB 307 over wireless links 313-316 using an LTE wireless protocol. Wireless device 301-302 may also be capably of exchanging LTE communications with eNodeB 307 but, in this example, are exchanging wireless communications with picocell 306 using LTE or some other wireless protocol. To provide wireless communication services to wireless devices 301 and 302, picocell 306 requires a backhaul link to wireless network 308. The backhaul link in this example is an LTE wireless link with eNodeB 307. Thus, from the aspect of eNodeB 307, picocell 306 is merely another LTE device, like wireless devices 303-305, exchanging communications with eNodeB 307. However, in this example, picocell 306 may be allocated constant resources of eNodeB 307 unlike other wireless devices 303-305, which will be allocated resources as needed. Additionally, picocell 306 exchanges communications with eNodeB 307 over a different higher gain antenna system comprising antenna elements 331 and amplifier 333. Higher antenna elements 331 have a higher gain than antenna elements 332 and amplifier 333 is a higher power (i.e. higher gain) power amplifier than amplifier 332.

Figure 4:
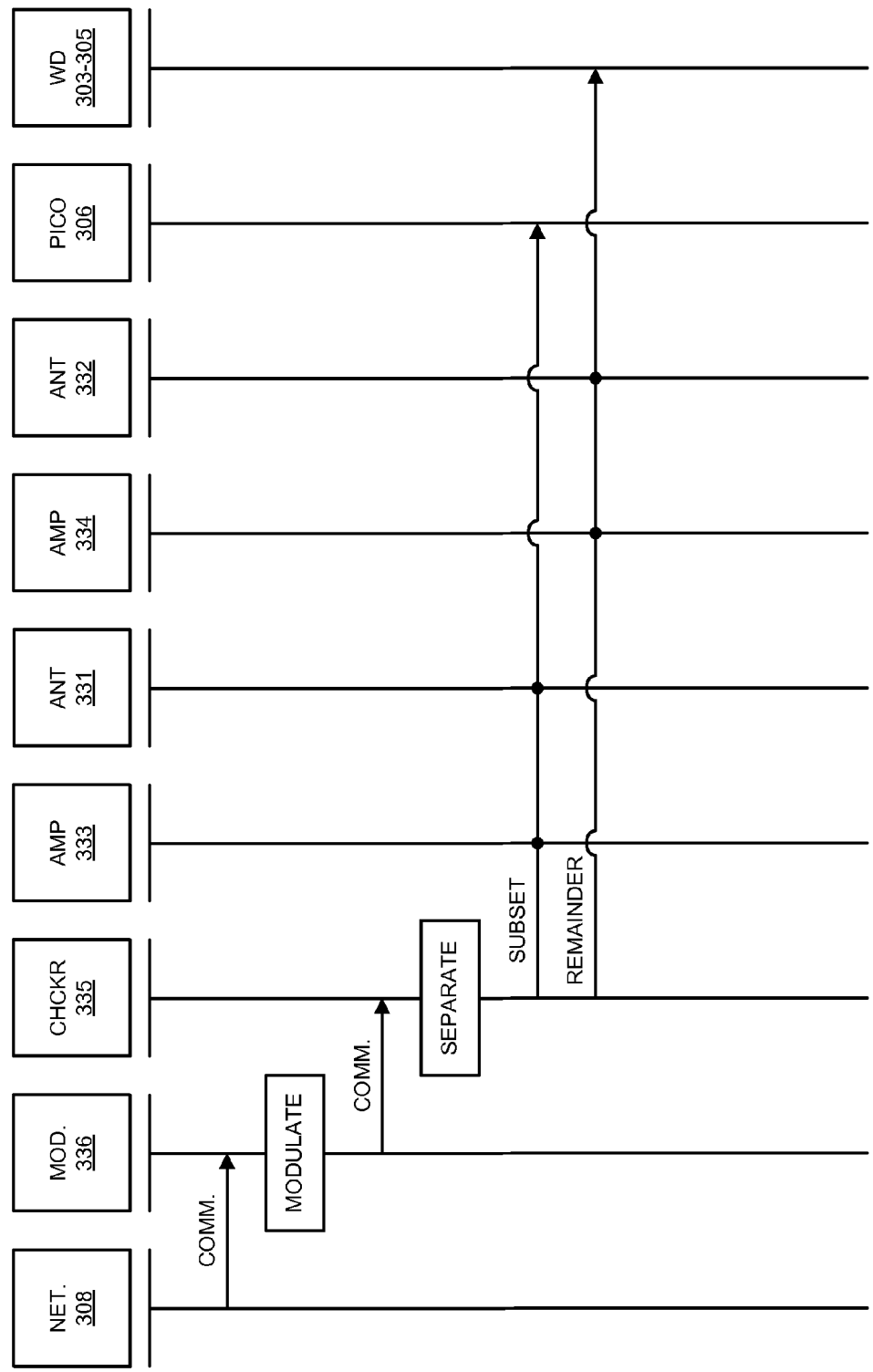
FIG. 4 illustrates an operation of the wireless communication system to provide in-band backhaul from a wireless macrocell.

FIG. 4 illustrates the operation of wireless communication system 300 to provide in-band backhaul from a wireless macrocell. Communications destined for wireless devices 303-305 and picocell 306 are transferred to eNodeB 307 from wireless network 308. Modulator 336 then modulates the communications using Quadrature Phase Shift Keying (QPSK), Quadrature Amplitude Modulation (QAM), or some other modulation scheme.

Different modulation schemes or different levels of the same modulation scheme may be used between wireless devices 303-305 and picocell 306. For example, modulator 336 may modulate communications destined for wireless devices 303-305 using QPSK up to 64QAM depending on wireless signal conditions to each of the devices. Modulator 336 may use constellations of QAM greater than 64QAM (64QAM+) for communications destined for picocell 306 because the higher gains of antenna elements 331 and amplifier 333 allow for 64QAM+ modulation without causing an undesirably high error rate that may occur over antenna elements 332 and amplifier 334. In some examples, eNodeB 307 may include multiple modulators, such as one modulator to handle communications destined for wireless devices 303-305 and another modulator to handle communications destined for picocell 307.

The communications are modulated into frequency resource segments designated for wireless devices 303-305 and picocell 306. The frequency resources segments are divisions of the frequency band (or one of the frequency bands) that eNodeB 307 is allocated to use. Different frequency resource segments are used for communications destined for each of wireless devices 303-305 and picocell 306 so that communications transferred to each remain separated. As noted above, the segments used for communications transferred to picocell 306 remain constant while the segments used for communication transferred to wireless devices 303-305 may change.

After modulation, segment checker 335 identifies the frequency resource segments that are allocated to picocell 305 and passes those segments to higher gain amplifier 333 which in turn are transmitted from higher gain antenna elements 331. Segment checker 335 passes all other segments to amplifier 334 which in turn are transmitted from antenna elements 332. Wireless devices 303-305 and picocell 306 may receive the communications transmitted from both antenna elements 331 and 332, however, as with a standard single antenna system eNodeB, the frequency resource segments allow for the devices and picocell to differentiate between their respective communications.

Figure 5:
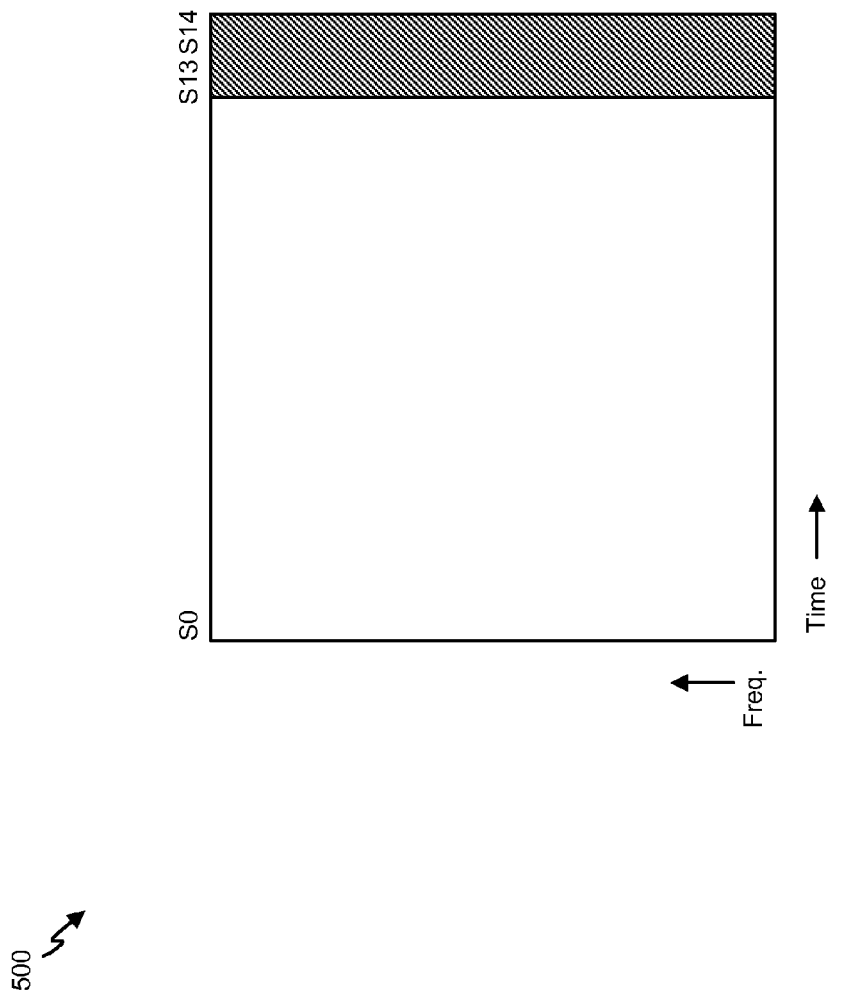
FIG. 5 illustrates a communication frame to provide in-band backhaul from a wireless macrocell.

FIG. 5 illustrates a time division LTE frame 500 for providing in-band backhaul from a wireless macrocell. Specifically, frame 500 is an example of a time division LTE frame generated by modulator 336. Frame 500 is divided into 15 symbols 0-14. Each symbol is an example of a frequency resource segment discussed above. The frequency band of the frame extends from the bottom of frame 500 to the top. Likewise, the time of the frame extends from left to right. Each symbol uses the entire frequency band for a fraction of the time used for transmitting the entire frame 500.

Modulator 336 modulates communications directed to wireless devices 303-305 among symbols S0-S12 with each device being allocated one or more of the symbols. Similarly, modulator 336 modulates communications directed to picocell 306 into symbols S13-S14. Accordingly, upon receipt of the frame from eNodeB 307, a particular device (or picocell) will read its designated symbol(s) in order to ascertain communications destined for that device.

As the frame is passed to checker 335, checker 335 directs symbols S0-S12 to amplifier 334 and antenna elements 332 for wireless transmission. Upon receiving symbols S13-S14, checker 335 directs symbols S13-S14 to amplifier 333 and antenna elements 331 for wireless transmission. Since checker 335 passes the symbols to the two respective antenna systems in the proper time sequence, antenna elements 332 transmit symbols S0-S12 while antenna elements 331 are not transmitting symbols and then antenna elements 331 transmit symbols S13-S14 while antenna elements 332 are not transmitting symbols. Therefore, wireless devices 303-305 and picocell 306 are able to treat the communications from eNodeB 307 as if they were sent as a single frame 500 from the same antenna system even though the communications transferred to picocell 306 were from a higher gain antenna system.

Figure 6:
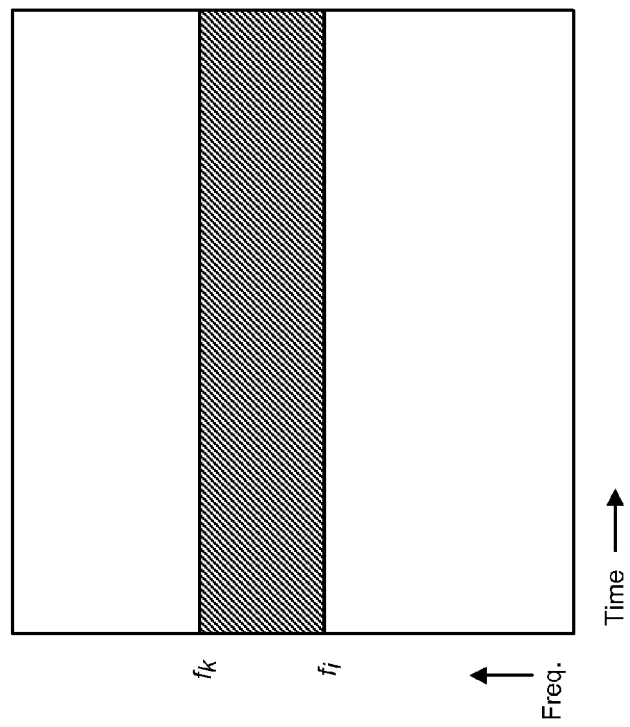
FIG. 6 illustrates a communication frame to provide in-band backhaul from a wireless macrocell.

FIG. 6 illustrates a frequency division LTE frame 600 for providing in-band backhaul from a wireless macrocell. Specifically, frame 600 is an example of a frequency division LTE frame generated by modulator 336. The time axis of frame 600 extends from left to right. Frame 600 is divided across subcarriers within the frequency band extending from the bottom of frame 600 to the top. Each subcarrier is an example of a frequency resource segment discussed above. In some examples, a subcarrier may be further divided among time segments to create more granular frequency resource segments.

Modulator 336 modulates communications directed to picocell 306 into subcarriers $f_i$-$f_k$. Similarly, modulator 336 modulates communications directed to wireless devices 303-305 among the remaining subcarriers. Accordingly, upon receipt of the frame from eNodeB 307, a particular device (or picocell) will read its designated subcarrier in order to ascertain communications destined for that device.

As the frame is passed to checker 335, checker 335 directs subcarriers $f_i$-$f_k$ to amplifier 333 and antenna elements 331 for wireless transmission. Likewise, checker 335 directs the remaining subcarriers to amplifier 334 and antenna elements 332 for wireless transmission. Therefore, antenna elements 331 transmit subcarriers for frame 600 while antenna elements 332 transmit the remaining subcarriers for frame 600.

As such, wireless devices 303-305 and picocell 306 are able to treat the communications from eNodeB 307 as if they were sent from the same antenna system even though the communications transferred to picocell 306 were from a higher gain antenna system.

Referring back to FIG. 3, modulator 336 comprises hardware components to convert digital communications from wireless network 308 into LTE radio frequency communication signals for transmission from eNodeB 307. Specifically, modulator 336 may include a channel coder, baseband filters, digital to analog converters, up-converters that bring the baseband analog signal up to a carrier frequency, and other components that may be necessary to convert received digital communications to an analog RF signal.

Checker 335 comprises hardware components to separate frequency resource segments between the two antenna systems. Specifically, checker 335 may include an RF signal splitter to duplicate the analog signal output by modulator 336, RF filters to filter out frequency resource segments not being sent to each amplifier system (e.g. subcarriers not being sent to one or the other antenna systems in accordance with FIG. 6), hardware to cut off time division symbols of from being sent to each amplifier system (e.g. time division symbols not being transferred by one or the other antenna systems in accordance with FIG. 5), amplifiers, and/or any other hardware needed to split frequency resource segments between the two antenna systems as described herein.

Figure 7:
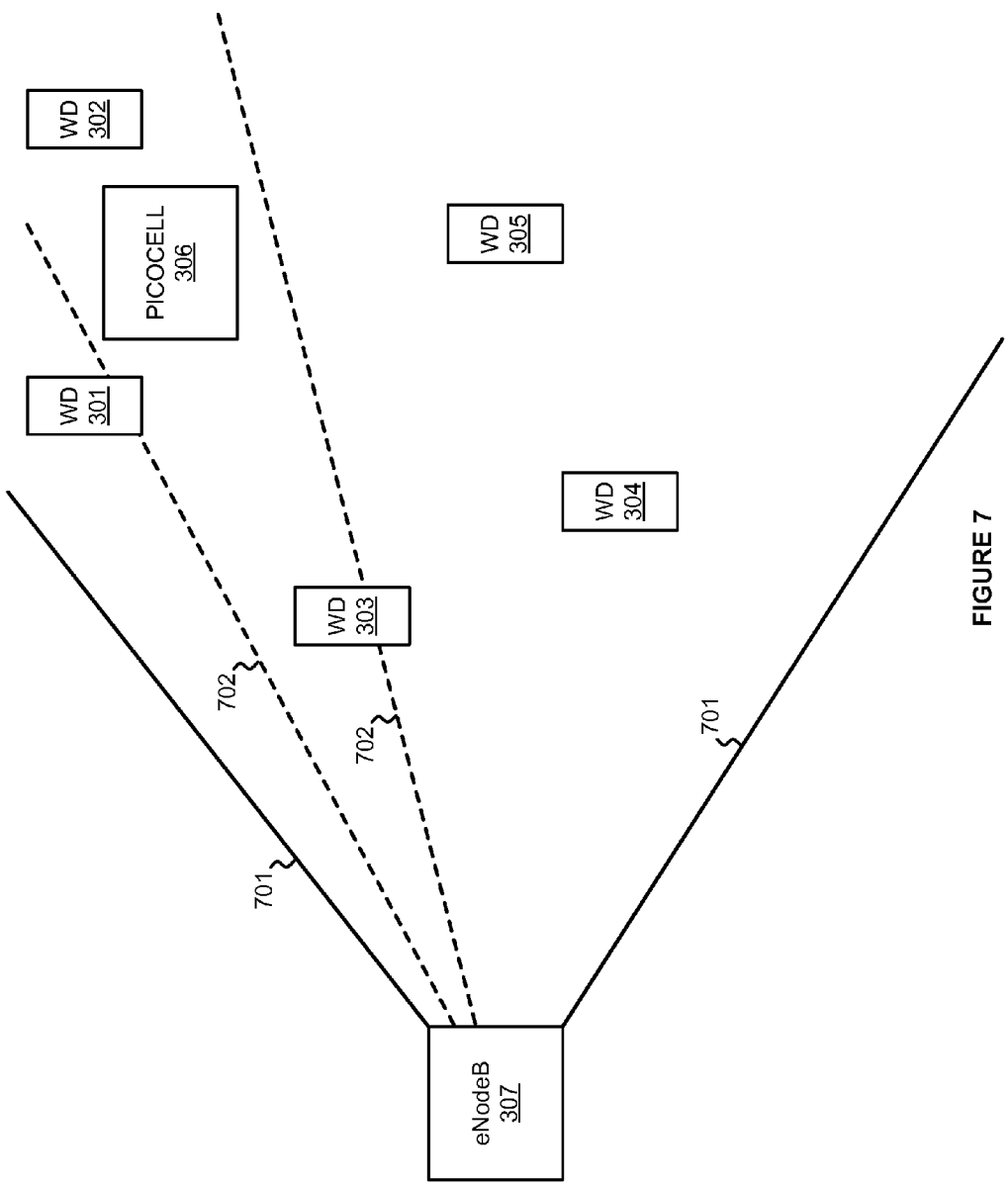
FIG. 7 illustrates a representation of a cell sector when providing in-band backhaul from a wireless macrocell.

FIG. 7 illustrates a representation of a cell sector 701 covered by eNodeB 307 when providing in-band backhaul from a wireless macrocell. In this example, antenna elements 332 transmit wireless signals to wireless devices 303-305 in cell sector 701. Antenna elements 331 transmit wireless signals to picocell 306 within a smaller portion 702 of cell sector 701. In this example, antenna elements 331 are higher gain directional antenna elements that are directed at picocell 306 to form portion 702. Directional antenna elements 331 along with higher power amplifier 333 transmit the frequency resource segments directed to picocell 306 at a higher gain than antenna elements 332 and amplifier 332 to improve signal quality for communications received by picocell 306. Accordingly, picocell 306 is better able to receive backhaul communications from eNodeB 307 when providing wireless service to wireless devices 301 and 302.

In some embodiments, antenna elements 331, regardless of whether the elements are directional, may be arranged in a multiple-input multiple-output (MIMO) configuration that maximizes throughput to picocell 306. Even if antenna elements 332 are also in a MIMO configuration, the higher gain of antenna elements 331 and amplifier 333 may allow the maximum throughput configuration of antenna elements 331 without unacceptable amounts of communication errors when received by picocell 306.

Figure 8:
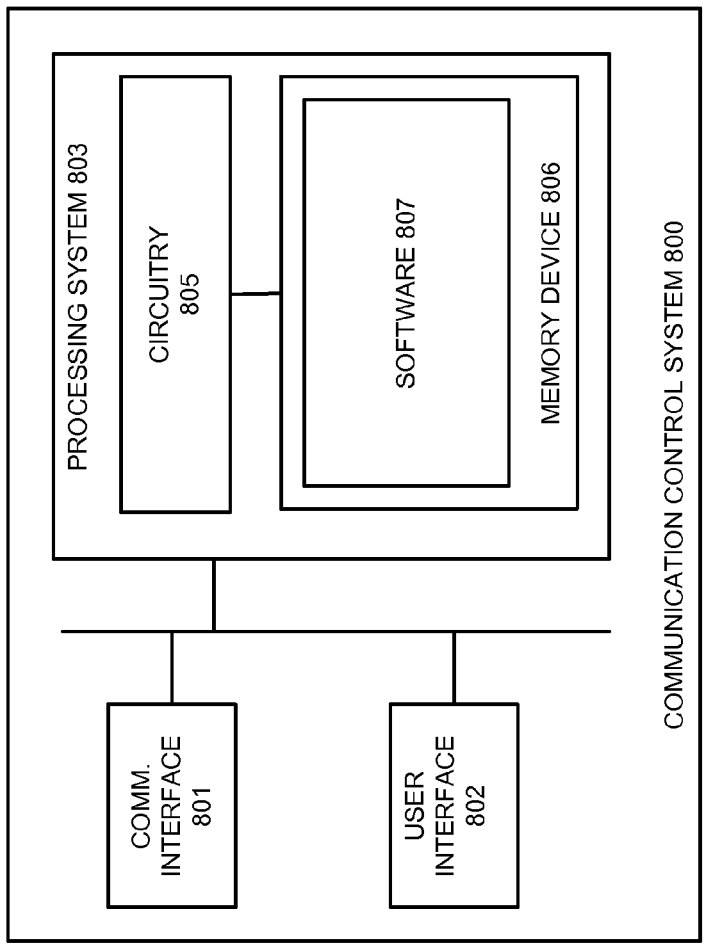
FIG. 8 illustrates a wireless access node for providing in-band backhaul from a wireless macrocell.

FIG. 8 illustrates communication control system 800. Communication control system 800 may be included in access node 103 or eNodeB 307 to control the provision of in-band backhaul from a wireless macrocell. In some examples, control system 800 may be located externally to access node 103 or eNodeB 307. Communication control system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 may include an operating system, utilities, drivers, network interfaces, applications, or some other type of software. When executed by circuitry 805, operating software 807 directs processing system 803 to operate communication control system 800 as described herein.

In particular, operating software 807 directs processing system 803 to instruct a wireless access node to receive communications for wireless transfer from the wireless access node using a first antenna system and a second antenna system, wherein a gain of the first antenna system is higher than a gain of the second antenna system. Operating software further directs processing system 803 to instruct a modulator to modulate a first subset of the communications that should be transferred over the first antenna system at a greater level of modulation that communications other than the first subset.

A checker for the wireless access node determines the first subset of the communications for transfer over the first antenna system after the communications have been modulated. The first antenna system transfers the first subset of the communications using a first portion of the plurality of frequency resource segments and the second antenna system configured to transfer communications other than the first subset of the communications using frequency resource segments other than the first portion of the plurality of frequency resource segments The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a macro base station having a first antenna system and a second antenna system, wherein the macro base station is allocated a plurality of frequency resource segments, the method comprising:

receiving communications for wireless transfer from the macro base station using the first antenna system and the second antenna system, wherein a gain of the first antenna system is higher than a gain of the second antenna system;

determining a first subset of the communications intended for wireless transfer to a picocell over the first antenna system;

allocating dedicated resources comprising the first antenna system and a first portion of the plurality of frequency resource segments to the picocell;

utilizing the dedicated resources to transfer the first subset of the communications intended for wireless transfer to the picocell by transferring the first subset of the communications from the first antenna system using the first portion of the plurality of frequency resource segments for delivery to the picocell; and transferring a second subset of the communications other than the first subset of the communications from the second antenna system using frequency resource segments other than the first portion of the plurality of frequency resource segments.

2. The method of claim 1, wherein the plurality of resource segments comprise symbols in a time division wireless protocol.

3. The method of claim 2, wherein the time division wireless protocol comprises a time division Long Term Evolution (LTE) wireless protocol.

4. The method of claim 1, wherein the plurality of resource segments comprise subcarriers in a frequency division wireless protocol.

5. The method of claim 4, wherein the frequency division wireless protocol comprises a frequency division Long Term Evolution (LTE) wireless protocol.

6. The method of claim 1, further comprising:
modulating the first subset of the communications at a first level of modulation that is greater than a second level of modulation;
modulating the second subset of the communications other than the first subset of the communications at the second level of modulation.

7. The method of claim 1, wherein the first antenna system transfers the first subset of the communications in a maximum throughput multiple-input multiple-output (MIMO) configuration.

8. The method of claim 1, wherein the first portion of the plurality of resource segments comprises a contiguous portion of the plurality of resource segments.

9. The method of claim 1, wherein the first antenna system includes a first power amplifier having a greater output power than a second power amplifier included in the second antenna system.

10. The method of claim 1, wherein the first antenna system comprises a plurality of directional antennas.

11. A macro base station having a first antenna system and a second antenna system, wherein the macro base station is allocated a plurality of frequency resource segments, the macro base station comprising:
a communication interface configured to receive communications for wireless transfer from the macro base station using the first antenna system and the second antenna system, wherein a gain of the first antenna system is higher than a gain of the second antenna system;
a checker configured to determine a first subset of the communications intended for wireless transfer to a picocell over the first antenna system, wherein dedicated resources comprising the first antenna system and a first portion of the plurality of frequency resource segments are allocated to the picocell;
the first antenna system configured to utilize the dedicated resources to transfer the first subset of the communications intended for wireless transfer to the picocell by transferring the first subset of the communications using the first portion of the plurality of frequency resource segments for delivery to the picocell; and
the second antenna system configured to transfer a second subset of the communications other than the first subset of the communications using frequency resource segments other than the first portion of the plurality of frequency resource segments.

12. The macro base station of claim 11, wherein the plurality of resource segments comprise symbols in a time division wireless protocol.

13. The macro base station of claim 12, wherein the time division wireless protocol comprises a time division Long Term Evolution (LTE) wireless protocol.

14. The macro base station of claim 11, wherein the plurality of resource segments comprise subcarriers in a frequency division wireless protocol.

15. The macro base station of claim 14, wherein the frequency division wireless protocol comprises a frequency division Long Term Evolution (LTE) wireless protocol.

16. The macro base station of claim 11, further comprising:
a modulator configured to modulate the first subset of the communications at a first level of modulation that is greater than a second level of modulation and modulate the second subset of the communications other than the first subset of the communications at the second level of modulation.

17. The macro base station of claim 11, wherein the first antenna system transfers the first subset of the communications in a maximum throughput multiple-input multiple-output (MIMO) configuration.

18. The macro base station of claim 11, wherein the first portion of the plurality of resource segments comprises a contiguous portion of the plurality of resource segments.

19. The macro base station of claim 11, wherein the first antenna system includes a first power amplifier having a greater output power than a second power amplifier included in the second antenna system.

20. The macro base station of claim 11, wherein the first antenna system comprises a plurality of directional antennas.

* * * * *